Nov. 19, 1929.  C. P. NELSON  1,735,932
HOSE CLAMP
Filed April 27, 1928
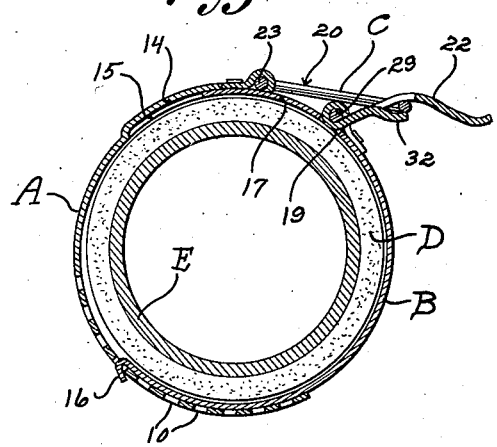
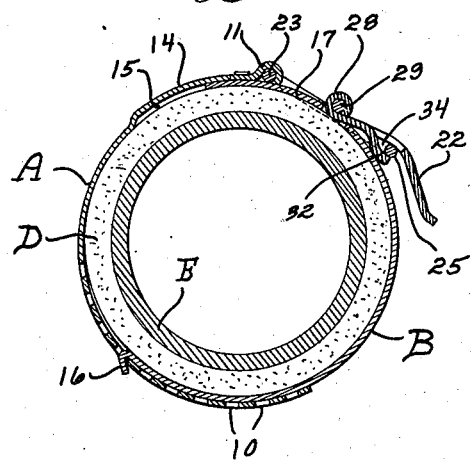
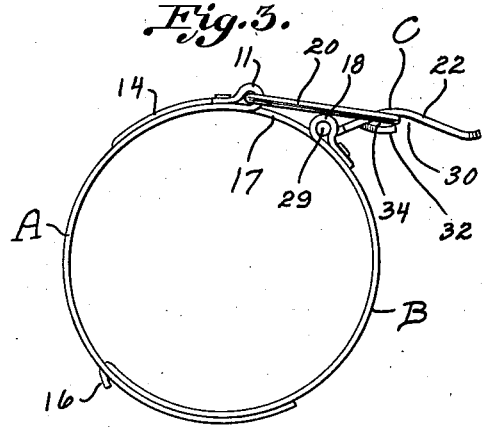
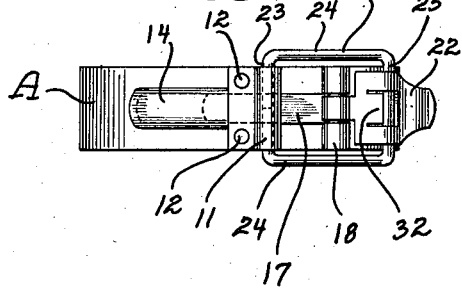
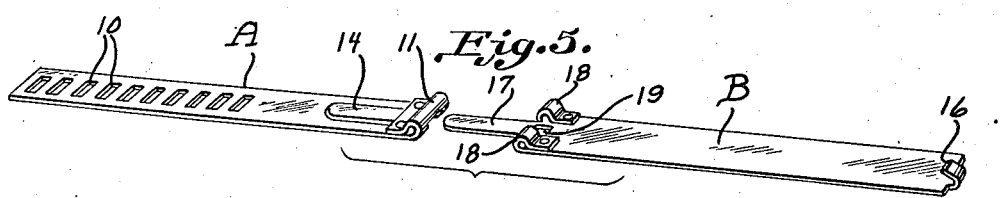
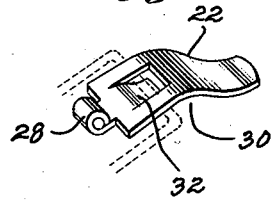
Inventor
Charles P. Nelson Patented Nov. 19, 1929

1,735,932

UNITED STATES PATENT OFFICE

CHARLES PHILLUP NELSON, OF SANTA MONICA, CALIFORNIA

HOSE CLAMP

Application filed April 27, 1928. Serial No. 273,316.

The present invention relates to improvements in hose clamps primarily, tho not essentially adapted for use in connection with the radiator hose connections for internal combustion engines of motor vehicles, and the primary object of the invention is to provide an improved hose clamp which may be readily and easily applied to a section of hose for clamping the same about a section of pipe without the use of any tools.

A further object of the invention is to provide an improved hose clamp embodying features whereby the clamp may be contracted thru means of a lever adapted to snap into such a position as to retain the clamp in its contracted condition.

A further object of the invention is to provide an improved hose clamp embodying features of adjustment whereby the diameter of the band may be varied for permitting use of the clamp about sections of hose of various diameters.

A further object of the invention is to provide an improved type of "snap on" hose clamp embodying a novel arrangement whereby the locking lever when swung to an open position acts to forcibly expand the sections of the clamp.

A still further and important object of the invention is to provide a hose clamp embodying a pair of complementary sections of novel construction which may be readily stamped from strips of band metal, and into such formation that when the sections are in clamped engagement about a section of hose a practically continuous metal contact is made thruout the entire circumference of the hose.

Other objects and advantages of the invention will be apparent during the course of the following detailed description, taken in connection with the accompanying drawing, forming a part of this specificaton and in which drawing:

Figure 1 is a section taken circumferentially of the clamp, showing the same applied, and showing the parts in a condition prior to being contracted about a section of hose.

Figure 2 is a circumferential section thru the clamp shown in its locked or contracted position about the hose.

Figure 3 is a side elevation of the improved clamp.

Figure 4 is a top plan view of the clamp.

Figure 5 is a view showing the construction of the complementary band sections.

Figure 6 is a perspective view of the locking or operating lever for contracting and also expansion of the band sections.

Referring to the drawing in detail, and wherein similar reference characters designate corresponding parts thruout the several views, the improved clamp has been shown as comprising a pair of complementary band sections A and B, having operating means C carried by adjacent ends of the bands and operable for contracting and expanding the clamp. The letter D may designate a section of rubber hose and E a section of pipe over which the hose D has a sliding fit.

Referring first to the specific construction of the clamp section A, the same is preferably formed from a strip of band metal and is provided thruout a substantial portion of its length with a series of spaced, rectangular-shaped apertures 10. The opposite end of the strip is curled outwardly for providing a transversely extending hinge barrel 11. The extreme end of the strip is bent to lie flat upon the outer side of the strip rearwardly of the hinge barrel and is secured as by means of rivets 12 at points adjacent each edge of the strip. Rearwardly of the hinge barrel 11 the strip is struck outwardly at its longitudinal center as at 14 for forming a longitudinally extending channel 15 of a depth equal to the thickness of the material from which the clamp sections are formed. As will be observed in the drawing, this channel 15 extends beneath the hinge barrel 11 and opens at the forward end of the strip. As will be observed in Figure 5, the central, inner portion of the hinge barrel 11 is cut away so that the mouth or open end of the pocket or channel 15 opens at the end of the strip A.

The clamp section B is preferably formed from a strip of band material similar to that of the clamp section A, and is provided at its rear end with an outwardly formed hook 16 which is adapted to engage in any of the apertures 10 of the strip A. The forward end portion of the strip B is slit longitudinally to provide a tongue 17, and the metal at each side of the tongue is then curled outwardly and rearwardly upon the body portion of the strip for providing a pair of spaced hinge barrels 18 aligning transversely of the strip at the rear end of the tongue 17. The strip B, between the spaced hinge barrels 18 is provided with a rectangular shaped opening 19 for a purpose to be subsequently explained. The band sections A and B are of course of a flexible nature so that the same may be readily bent into arcuate formation and form a substantially annular band as shown in Figures 1, 2 and 3. As will be observed by the dotted line showings in Figure 4, the tongue 17 is of a width equal to the width of the channel 15.

Referring now to the operating means C for contracting and expanding the clamp sections A and B, the same embodies a link 20 carried by the clamp section A, and an operating lever 22 carried by the clamp section B. The link 20 which may be formed from a length of wire of a suitable gauge, embodies a hinge or pivot portion 23 for pivotal mounting in the hinge barrel 11, and a pair of parallel arm portions 24 connected by a cross piece or head 25. As will be observed in Figure 1, the pivot portion 23 of the link is arranged outwardly of the channel 15 and thus does not interfere with entrance of the tongue 17 into the open end of the channel.

The operating lever 22 of the operating means C is preferably struck from sheet metal and has its forward end curled outwardly as at 28 to form a hinge barrel adapted to be disposed between the spaced hinge barrels 18 of the strip B, and receive therethru a pivot pin 29 for pivotally connecting the lever to the strip at the rear end of the tongue 17. The lever 22 is arcuated longitudinally and forms a transverse cavity 30. Struck inwardly from the central portion of the lever 22 and at a point adjacent the forward pivoted end of the lever, is a rearwardly extending tongue 32 which projects into the cavity 30 and forms a rearwardly opening pocket 34 for receiving the transverse head piece 25 of the link 20. This tongue 32 is preferably arched longitudinally in an opposite direction from that of the body portion of the lever 22 and acts as a lift for swinging the link about the pivot 23 when the operating lever is swung outwardly from the strip B. Upon further outward swinging of the lever 22 from a position as shown in Figure 1, the tongue 22 will act to exert a pushing action on the link 20 and cause spreading of the adjacent ends of the bands A and B so that the clamp sections are forced free from the hose D.

When applying the improved clamp about a section of hose, the hook 16 is first placed in the desired one of the apertures 10 so that the terminal portion of the tongue 17 preferably extends for a short distance into the open end of the channel 15. The free end of the lever 22 is then passed thru the link 20 and swung about its pivot pin 29 so that the cross piece or head 25 of the link is automatically moved into the rearwardly opening pocket 34 formed by the inwardly struck tongue 32 as shown in Figure 1. The lever 22 is then swung to a position overlying the band section B until the tongue 32 engages the band section as in Figure 2, and in which position the arms 24 of the link will have moved past the axial center of the pivot pin 29 so that the clamp sections are held in a contracted condition upon the hose. When the clamp is in its clamping position as shown in Figure 2 it will be seen that the tongue 32 retains the free end of the lever 22 out of engagement with the clamp section B and thus allows for the lever to be readily swung to an open position by allowing for one's finger to be inserted between the free end of the lever and the clamp section. When the clamp is in its clamping position about the hose it will be seen that practically a continuous contact is had by the clamp thruout the entire circumference of the hose and thus effectively clamp the hose to the pipe section E.

By observing Figures 1 and 2 it will be seen that the aperture 19 provided between the hinge barrels 18 provides an opening in the clamp section B for receiving the hinge barrel 28 of the operating lever 22.

While if so desired the band sections A and B may be of one piece construction, it is preferred that the clamp consist of a pair of adjustably connected sections for allowing the clamp to be used in connection with sections of hose of various diameters.

From the foregoing description it will be observed that a novel and improved type of hose clamp has been provided embodying a novel locking means which acts for allowing ready expansion of the clamp. It will also be apparent that a novel construction for the band sections of the clamp has been provided whereby the sections may be readily formed from strips of sheet metal and when connected about a section of hose will have contact with the hose substantially thruout the entire circumference of the hose.

Changes in detail may be made in the form of invention herein shown and described, without departing from the spirit of the invention or the scope of the following claims.

I claim:

1. A hose clamp comprising a pair of complementary flexible metal band sections, means adjustably connecting the sections at one end, one of said sections at its free end having its end curled to provide a transversely extending hinge barrel and having a channel of a depth equal to the thickness of the band sections opening at the free end of the section, and the companion section at its free end having a reduced tongue for fitting in said channel and at the inner end of the tongue and at each side thereof provided with hinge barrels aligning transversely of the section, a rectangular shaped link pivotally mounted at one end in the hinge barrel of said first band section, and a lever pivotally connected at one end between the spaced hinge barrels and having a rearwardly projecting tongue forming a pocket for receiving the free end portion of said link.

2. A hose clamp comprising a pair of complementary band sections, means detachably connecting the sections together at one end, a link pivotally connected at one end to the free end of one of the band sections and having a transverse head piece at its free end, and a lever pivotally connected to the free end of the companion band section and having a tongue struck inwardly therefrom providing a rearwardly opening pocket for receiving the transverse head piece of said link.

3. In a hose clamp comprising a pair of complementary band sections, means for contracting the band sections comprising a link pivotally connected at one end to the free end of one of the band sections, and a longitudinally curved lever providing a transverse cavity at the inner side of the lever, pivotally connected at one end to the free end of the companion band section and having an inwardly struck tongue having its free end projecting into said cavity toward the free end of the lever and forming with the lever a rearwardly opening pocket for receiving the free end of the link, said tongue acting to swing the link to a free position and causing expansion of the band sections.

4. In a hose clamp comprising a pair of complementary band sections, a link pivotally connected at one end to the free end of one of the band sections, and a lever pivotally connected at one end to the free end of the companion band section and having a tongue struck inwardly therefrom to act as a lift for the free end of the link when the lever is swung to its open position.

CHARLES PHILLUP NELSON.